US012616946B2

(12) United States Patent
Hattori et al.

(10) Patent No.: US 12,616,946 B2
(45) Date of Patent: May 5, 2026

(54) APPARATUS AND METHOD FOR MANUFACTURING SLURRY FOR BATTERY

(71) Applicant: HONDA MOTOR CO., LTD., Tokyo (JP)

(72) Inventors: Tatsuya Hattori, Saitama (JP); Yuji Isogai, Saitama (JP); Hideki Sakai, Saitama (JP); Atsushi Sakurai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 587 days.

(21) Appl. No.: 18/154,871

(22) Filed: Jan. 16, 2023

(65) Prior Publication Data

US 2023/0234008 A1 Jul. 27, 2023

(30) Foreign Application Priority Data

Jan. 26, 2022 (JP) ................................. 2022-010337

(51) Int. Cl.
| | |
|---|---|
| *B01F 35/213* | (2022.01) |
| *B01F 35/214* | (2022.01) |
| *G01N 23/04* | (2018.01) |
| *H01M 4/139* | (2010.01) |

(52) U.S. Cl.
CPC ........ *B01F 35/213* (2022.01); *B01F 35/2144* (2022.01); *G01N 23/04* (2013.01); *H01M 4/139* (2013.01)

(58) Field of Classification Search
CPC .... G01N 23/04; B01F 35/213; B01F 35/2144
USPC ............................................ 366/142; 378/15
See application file for complete search history.

(56) References Cited

U.S. PATENT DOCUMENTS

| | | | | |
|---|---|---|---|---|
| 3,139,269 | A | * | 6/1964 | Koning .................... B01F 35/80 137/119.06 |
| 3,256,181 | A | * | 6/1966 | Zingg ..................... B01F 35/82 507/924 |
| 3,443,092 | A | * | 5/1969 | Carr-Brion ........... G01N 23/223 378/47 |

(Continued)

FOREIGN PATENT DOCUMENTS

| | | |
|---|---|---|
| CN | 1311710 A | 9/2001 |
| CN | 102151512 A | 8/2011 |

(Continued)

OTHER PUBLICATIONS

Office Action issued Jul. 16, 2025 in the CN Patent Application No. 202211663531.X.

(Continued)

*Primary Examiner* — David L Sorkin
(74) *Attorney, Agent, or Firm* — CKC & Partners Co. LLC

(57) ABSTRACT

To detect the state of a slurry during stirring without exposure to the atmosphere and with high accuracy. A stirring tank stores a slurry for a battery without exposure to the atmosphere. A stirring device stirs the slurry in the stirring tank. An observation container is coupled to the stirring tank. A circulation device circulates the slurry between the stirring tank and the observation container without exposure to the atmosphere. A detection device detects the state of the slurry by irradiating the slurry in the observation container with X-rays and detecting the X-rays transmitted through the slurry.

4 Claims, 8 Drawing Sheets

(56)                References Cited

U.S. PATENT DOCUMENTS

| | | | | |
|---|---|---|---|---|
| 3,469,095 A | * | 9/1969 | Starnes | G01N 23/223 |
| | | | | 378/46 |
| 4,171,164 A | * | 10/1979 | Groves | A22C 17/008 |
| | | | | 378/53 |
| 4,403,866 A | * | 9/1983 | Falcoff | B44D 3/003 |
| | | | | 366/132 |
| 4,872,353 A | * | 10/1989 | Orr, Jr. | G01N 15/04 |
| | | | | 366/140 |
| 5,065,416 A | * | 11/1991 | Laurila | G01N 23/12 |
| | | | | 378/53 |
| 5,571,281 A | * | 11/1996 | Allen | B01F 25/3131 |
| | | | | 366/178.3 |
| 6,917,424 B2 | * | 7/2005 | Rodrigues | C09B 67/0066 |
| | | | | 356/326 |
| 11,519,868 B2 | * | 12/2022 | Verboomen | G01N 1/4077 |
| 2008/0003501 A1 | * | 1/2008 | Vincze | H01M 4/20 |
| | | | | 252/182.1 |
| 2018/0138545 A1 | * | 5/2018 | Aburatani | C03C 10/16 |
| 2020/0259182 A1 | | 8/2020 | Ota et al. | |
| 2021/0245121 A1 | | 8/2021 | Stirnimann | |

FOREIGN PATENT DOCUMENTS

| | | |
|---|---|---|
| CN | 207546425 U | 6/2018 |
| CN | 112203756 A | 1/2021 |
| JP | 2010277821 A | 12/2010 |
| JP | 2012040528 A | 3/2012 |
| JP | 2020129472 A | 8/2020 |
| WO | 0007705 A1 | 2/2000 |

OTHER PUBLICATIONS

Notification of Reasons for Refusal issued Oct. 28, 2025 in the JP Patent Application No. 2022-010337.

* cited by examiner

CENTRAL PORTION Ac

APPARATUS AND METHOD FOR MANUFACTURING SLURRY FOR BATTERY

This application is based on and claims the benefit of priority from Japanese Patent Application No. 2022-010337, filed on 26 Jan. 2022, the content of which is incorporated herein by reference.

BACKGROUND OF THE INVENTION

Field of the Invention

The present invention relates to an apparatus and a method for manufacturing slurries for a battery, i.e., slurries that serve as materials for a positive electrode, a negative electrode, an electrolyte, and the like of a battery.

Related Art

In recent years, electric vehicles such as EVs and HEVs have been widely used from the viewpoint of reducing emission of carbon dioxide to reduce adverse effects on the global environment. Accordingly, there is an urgent need to develop batteries to be mounted in electric vehicles and the like, and the technology to manufacture slurries for batteries with high quality is important.

Patent Document 1: Japanese Unexamined Patent Application, Publication No. 2020-129472

SUMMARY OF THE INVENTION

To manufacture a slurry for a battery with high quality, the optimization of the dispersion state of each substance constituting the slurry, specifically, the optimization of the dispersion states of an active material, a solid electrolyte, a binder, a conductivity aid, a solvent, an additive, and the like has been awaited. This is because, when they are not optimized, the intended electric performance is not exhibited in the completed battery, and the intended initial performance and durability may not be exhibited. Therefore, a detailed understanding of the state of the slurry during the stirring of the slurry is required.

However, a slurry for a battery may include substances, for example, a sulfur-based solid electrolyte, which are averse to contact with the atmosphere. Therefore, it is difficult to check the state of the slurry by removing the slurry from the stirring tank during stirring.

Thus, conventionally, the state of the slurry has been estimated based on the torque, viscosity, temperature, visual observation, and the like during the stirring of the slurry. Therefore, it has been difficult to understand the state of the slurry in detail.

In response to the above issue, it is an object of the present invention to detect the state of a slurry during stirring without exposure to the atmosphere and with high accuracy.

The present inventors have found that the state of a slurry during stirring can be observed without exposure to the atmosphere and with high accuracy by circulating the slurry between a stirring tank and an observation container without exposure to the atmosphere and by irradiating the slurry in the observation container with X-rays to detect the state of the slurry, and have reached the present invention. The present invention relates to the following manufacturing apparatus according to (1) to (4) and manufacturing method according to (5).

(1) A first aspect provides an apparatus for manufacturing a slurry for a battery. The apparatus includes:

a stirring tank configured to store a slurry for a battery without exposure to an atmosphere;

a stirrer configured to stir the slurry in the stirring tank; an observation container coupled to the stirring tank;

a circulator configured to circulate the slurry between the stirring tank and the observation container without exposure to an atmosphere; and a detector configured to detect a state of the slurry by irradiating the slurry in the observation container with X-rays and detecting the X-rays transmitted through the slurry.

This feature enables a state of the slurry during stirring to be detected without exposure to the atmosphere by circulating the slurry between the stirring tank and the observation container without exposure to the atmosphere and irradiating the slurry in the observation container with X-rays. In addition, since the state of the slurry is detected with X-rays, the state of the slurry can be detected with higher accuracy as compared with the case of estimating the state of the slurry based on the torque, viscosity, temperature, visual observation, and the like during the stirring of the slurry. Thus, the state of the slurry during stirring can be detected without exposure to the atmosphere and with high accuracy.

(2) In a second aspect according to the first aspect, an inside of the observation container is formed in a tapered shape that reduces in diameter in a circulation direction of the slurry.

According to this feature, since the inside of the observation container is reduced in diameter in a tapered shape, when the state of the slurry is analyzed, it is possible to select an inner diameter portion of the observation container with good X-ray resolution. Therefore, the state of the slurry can be detected with high resolution.

(3) In a third aspect according to the first or the second aspect, the detector includes a main body configured to emit and detect X-rays, and a rotator configured to rotate one of the main body or the observation container relative to the other. The detector is configured to irradiate the slurry in the observation container with X-rays from a plurality of angles different from each other, and to detect a state of the slurry from the plurality of angles, by way of cooperation between the rotator and the main body. The apparatus further includes a three-dimensional analyzer configured to perform three-dimensional analysis of the slurry based on the state of the slurry detected from the plurality of angles.

This feature enables the state of the slurry to be understood based on the three-dimensional analysis with higher accuracy.

(4) In a fourth aspect according to the third aspect, the apparatus further includes a stirring controller configured to determine a timing of ending the stirring of the slurry based on a result of the three-dimensional analysis.

According to this feature, by determining the timing of ending the stirring of the slurry based on the result of the three-dimensional analysis, it becomes easier to end the stirring without excess or deficiency at an appropriate timing.

(5) A fifth aspect provides a method for manufacturing a slurry for a battery. The method includes: stirring a slurry stored in a stirring tank without exposure to an atmosphere;

circulating the slurry between the stirring tank and an observation container during the stirring without exposure to an atmosphere; and detecting a state of the slurry by irradiating with X-rays the slurry flowing into the observation container from the stirring tank due to the circulating and detecting the X-rays transmitted through the slurry.

This method also enables the state of the slurry during stirring to be detected without exposure to the atmosphere and with high accuracy, as in the apparatus according to the first aspect.

As described above, according to the apparatus of the first aspect and the method of the fifth aspect, the state of the slurry during stirring can be detected without exposure to the atmosphere and with high accuracy. Further, according to the features of the second aspect to the fourth aspect that cite the first aspect, additional effects can be obtained.

DETAILED DESCRIPTION OF THE INVENTION

Hereinafter, an embodiment of the present invention will be described with reference to the drawings. However, the present invention is not limited to the following embodiment, and can be modified as appropriate and implemented without departing from the gist of the invention.

First Embodiment

Figure 1:
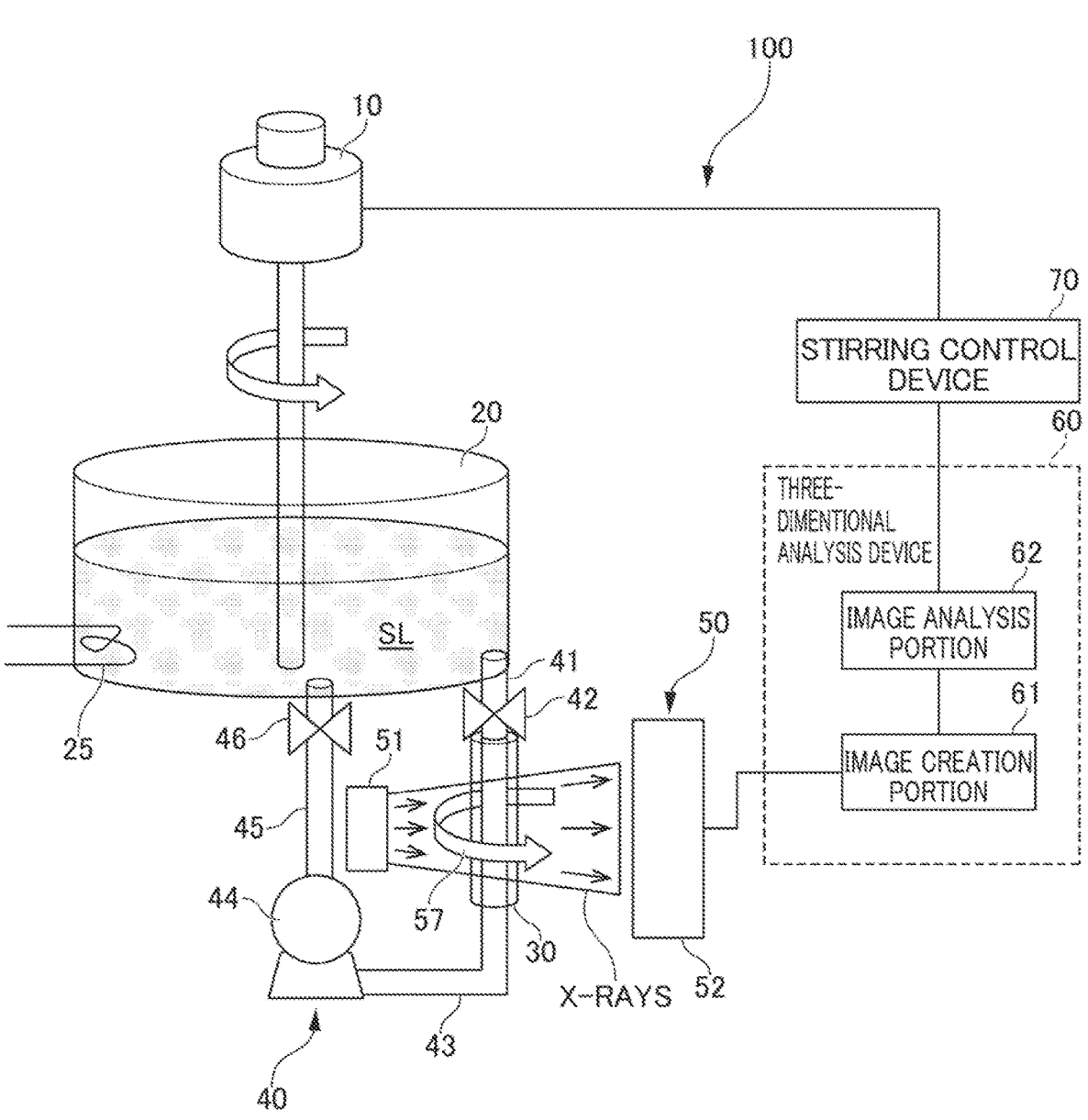
FIG. 1 shows an apparatus for manufacturing a slurry for a battery according to a first embodiment.

FIG. 1 shows a manufacturing apparatus 100 for a slurry SL for a battery according to the present embodiment. The manufacturing apparatus 100 includes a stirring device 10, a stirring tank 20, an observation container 30, a circulation device 40, a detection device 50, a three-dimensional analysis device 60, and a stirring control device 70.

The slurry SL contains, for example, an active material, a binder, a conductivity aid, a solvent, an additive, and the like, and also contains a substance that is averse to contact with the atmosphere, such as a sulfur-based solid electrolyte. Therefore, the slurry SL needs to be handled without exposure to the atmosphere.

The stirring tank 20 stores the slurry SL without exposure to the atmosphere. The stirring device 10 is a device for stirring the slurry SL in the stirring tank 20, and is controlled by the stirring control device 70. A heater 25 for heating the slurry SL is provided inside the stirring tank 20. The observation container 30 is a cylindrical container, and is coupled to the stirring tank 20 through the circulation device 40.

The circulation device 40 includes an inflow pipe 41, an inflow valve 42, a connection pipe 43, a pump 44, an outflow pipe 45, and an outflow valve 46. One end of the inflow pipe 41 is connected to the stirring tank 20, and the other end of the inflow pipe 41 is connected to one end of the observation container 30. The inflow valve 42 is provided at an intermediate portion of the inflow pipe 41, and opens and closes the inflow pipe 41. One end of the connection pipe 43 is connected to the end of the observation container 30 opposite to the side to which the inflow pipe 41 is connected, and the other end of the connection pipe 43 is connected to the suction port of the pump 44. One end of the outflow pipe 45 is connected to the discharge port of the pump 44, and the other end of the outflow pipe 45 is connected to the stirring tank 20. The outflow valve 46 is provided at an intermediate portion of the outflow pipe 45, and opens and closes the outflow pipe 45.

Hereinafter, the inflow valve 42 and the outflow valve 46 are collectively referred to as "valves 42 and 46". The circulation device 40 circulates the slurry SL between the stirring tank 20 and the observation container 30 without exposure to the atmosphere by opening the valves 42 and 46 and then operating the pump 44.

Figure 2:
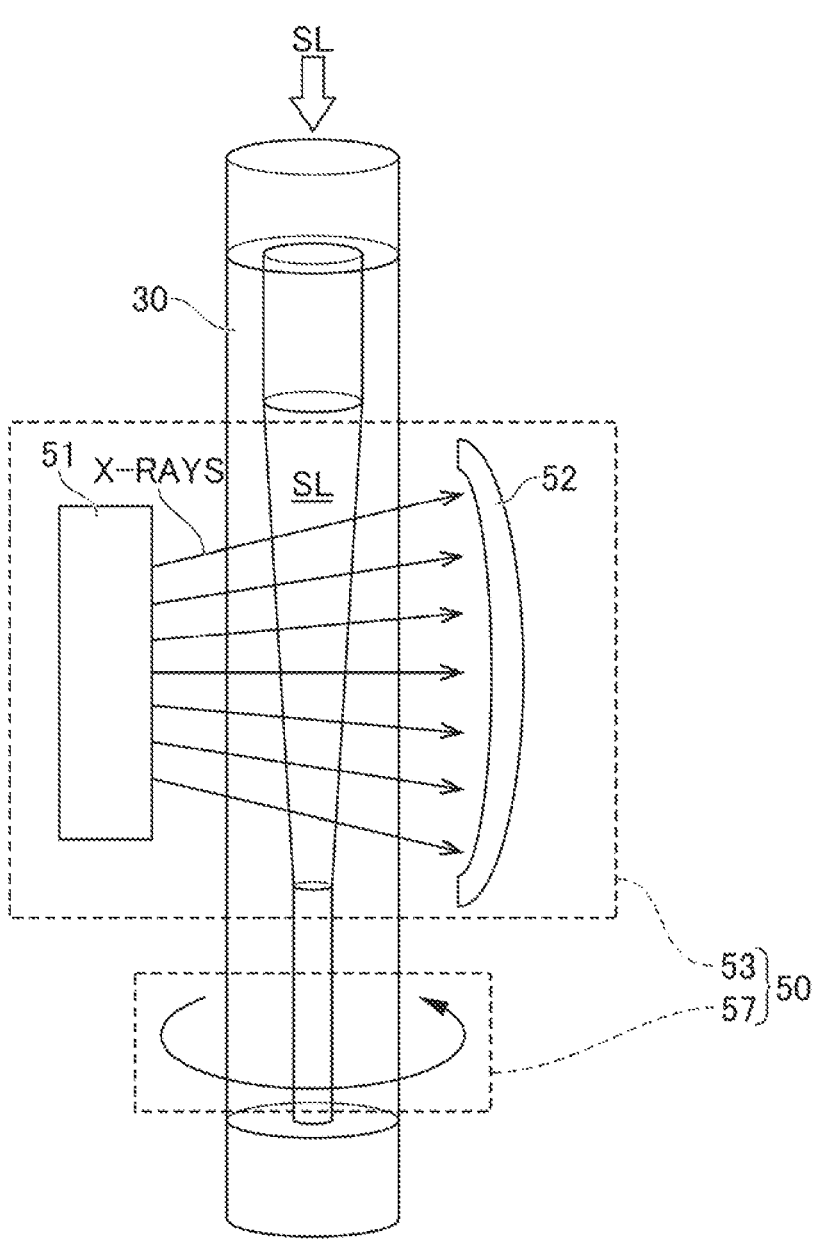
FIG. 2 shows an observation container and a detection device.

FIG. 2 shows the observation container 30 and the detection device 50. Hereinafter, the direction in which the slurry SL is circulated is simply referred to as a "circulation direction". The inside of the observation container 30 is formed in a tapered shape that reduces in diameter in the circulation direction. The observation container 30 has an average inner diameter of about 7 mm.

The detection device 50 includes a main body 53 and a rotation device 57. The main body 53 includes an irradiation portion 51 and a detection portion 52. The irradiation portion 51 irradiates the slurry SL in the observation container 30 with X-rays. The detection portion 52 detects the state of the slurry SL by detecting the X-rays transmitted through the slurry SL.

The rotation device 57 rotates one of the main body 53 or the observation container 30 relative to the other, with the circulation direction as the axis. Specifically, in the present embodiment, the main body 53 is fixed, and the rotation device 57 rotates the observation container 30. Alternatively, the observation container 30 may be fixed, and the rotation device 57 may rotate the main body 53.

The detection device 50 repeatedly performs a series of cooperating operations of the rotation device 57 and the main body 53 in which the observation container 30 is rotated by a predetermined angle by the rotation device 57, and then the state of the slurry SL is detected by the main body 53. Accordingly, the detection device 50 irradiates the slurry SL in the observation container 30 with X-rays from a plurality of angles different from each other, and detects the state of the slurry SL from the plurality of angles.

As shown in FIG. 1, the three-dimensional analysis apparatus 60 includes an image creation portion 61 and an image analysis portion 62. The image creation portion 61 creates a three-dimensional image based on the state of the slurry SL detected from the plurality of angles. The image analysis portion 62 analyzes the state of the slurry SL based on the created three-dimensional image. The stirring control device 70 determines whether stirring of the slurry SL is finished based on the analysis result.

Next, with reference to FIGS. 3 to 7, analysis performed by the three-dimensional analysis device 60 will be described.

Figure 3:
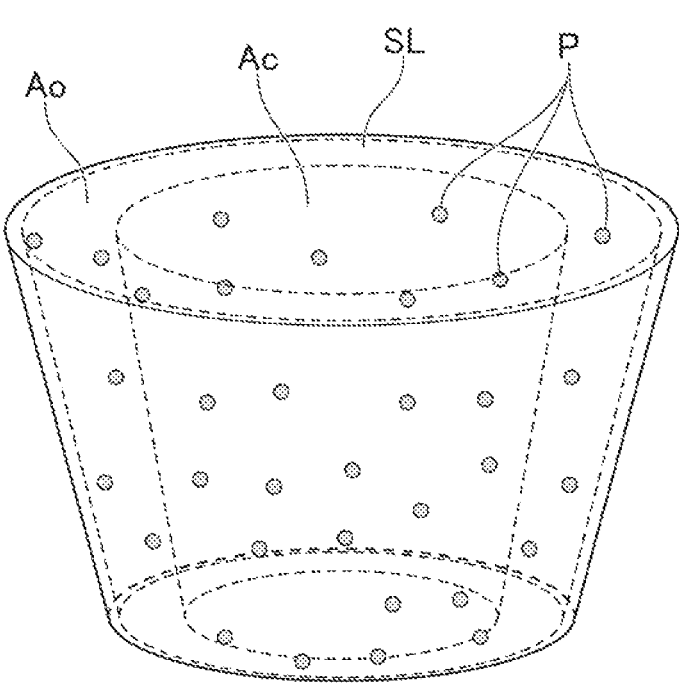
FIG. 3 shows an example of a three-dimensional image of a slurry.

FIG. 3 shows an example of a three-dimensional image of the slurry SL created by the image creation portion 61. Here, an active material P is contained in the slurry SL. Hereinafter, the center line and its peripheral region in the slurry SL in the observation container 30 are referred to as a "central portion Ac", and a region on the outer peripheral side of the central portion Ac is referred to as an "outer peripheral portion Ao". Specifically, each of the central portion Ac and the outer peripheral portion Ao occupies an area of 45% in each section of the slurry SL taken along a plane orthogonal to the circulation direction.

Figure 4:
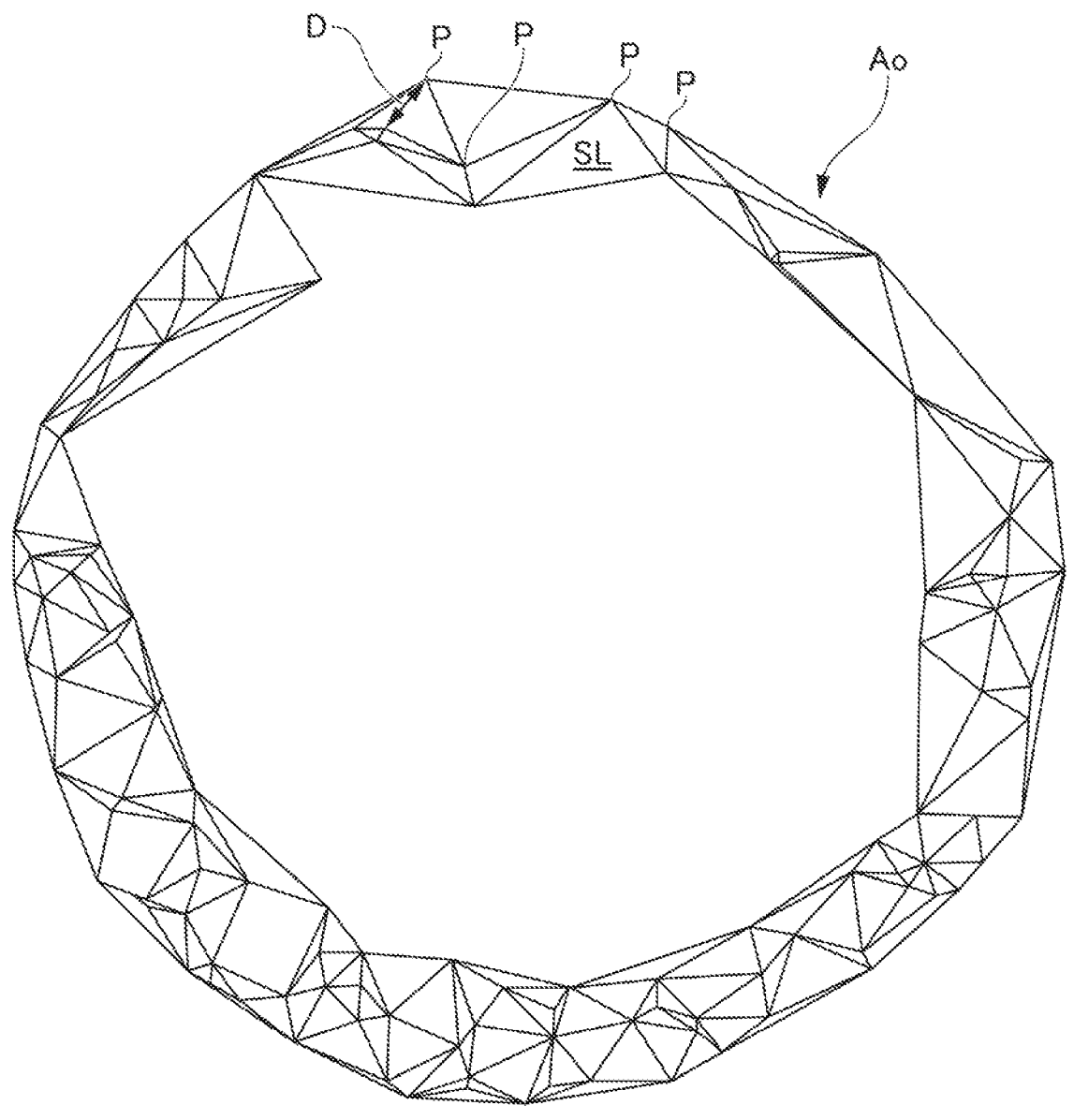
FIG. 4 shows an image of analysis of an outer peripheral portion of the slurry.

FIG. 4 shows an image of analysis of the outer peripheral portion Ao performed by the image analysis portion 62. Specifically, FIG. 4 shows a network obtained by connecting the centers of gravity of the active materials P detected in the outer peripheral portion Ao with straight lines, as viewed in the circulation direction. Therefore, the intersections of the network indicate the presence of the active materials P, and the distance between the intersections in three dimensions indicates a distance D between the centers of gravity of the active materials P.

Figure 5:
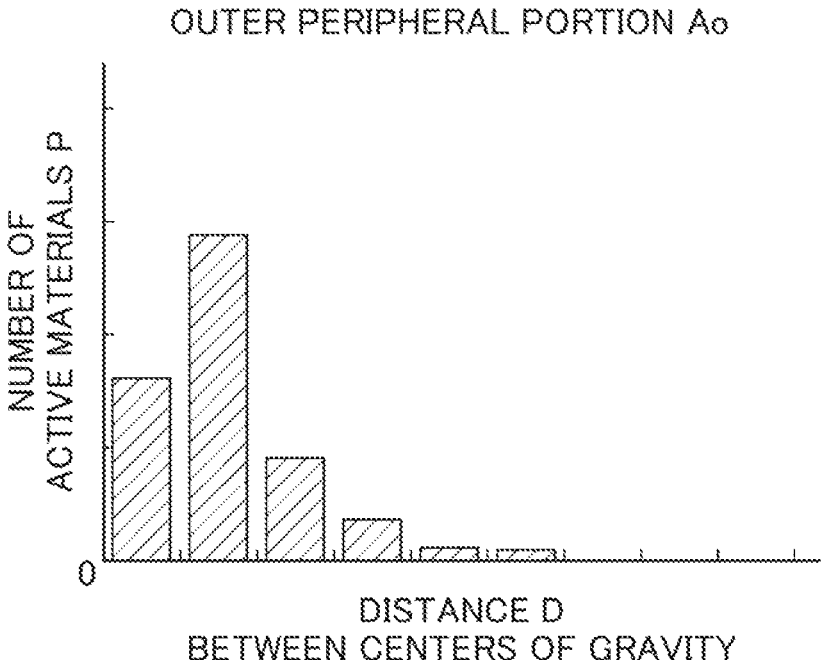
FIG. 5 shows an image of an analysis result of the outer peripheral portion.

FIG. 5 shows an image of an analysis result of the outer peripheral portion Ao performed by the image analysis portion 62, and shows the distribution of the distance D between the centers of gravity in the outer peripheral portion Ao. Specifically, the horizontal axis in FIG. 5 represents the distance D between the centers of gravity, and the vertical axis represents the number of the active materials P belonging to the distance D between the centers of gravity.

Figure 6:
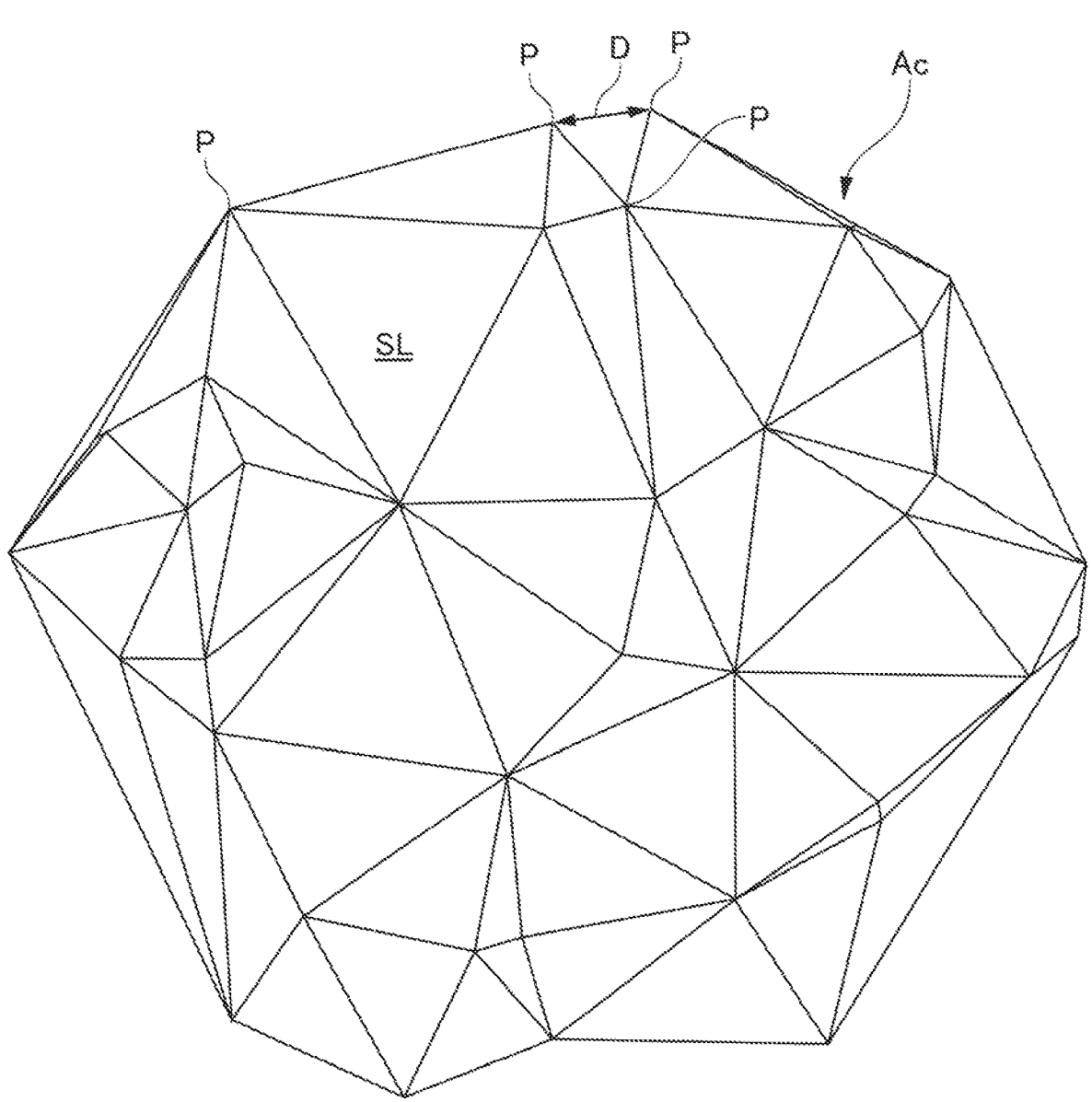
FIG. 6 shows an image of analysis of the central portion of the slurry.
Figure 7:
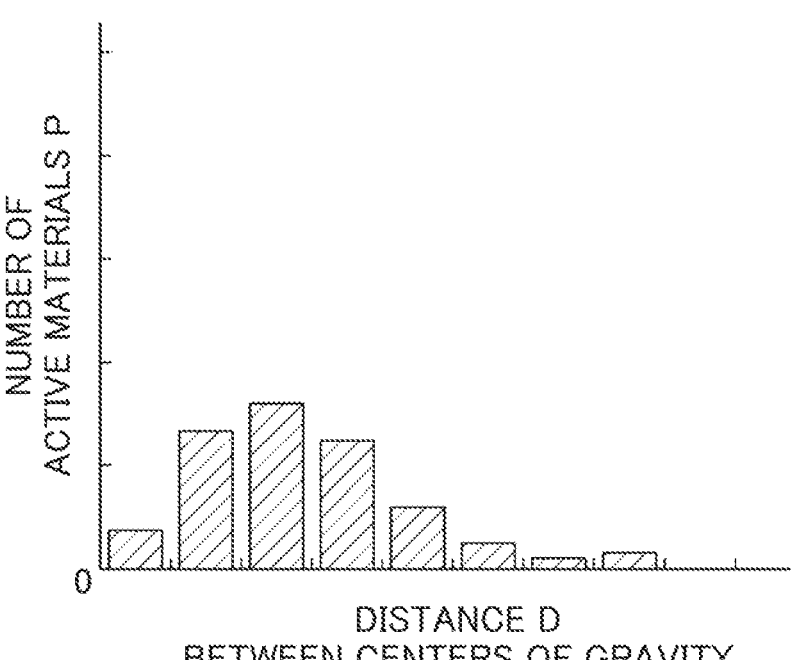
FIG. 7 shows an image of an analysis result of the central portion.

FIG. 6 shows an image of analysis of the central portion Ac performed by the image analysis portion 62. Specifically, FIG. 6 shows a network obtained by connecting the centers of gravity of the active materials P detected in the central portion Ac with straight lines, as viewed in the circulation direction. FIG. 7 shows an image of an analysis result of the central portion Ac performed by the image analysis portion 62, and shows the distribution of the distance D between the centers of gravity in the central portion Ac.

From the comparison between FIGS. 5 and 7, it is understood that the deviation of the distance D between the centers of gravity is greater in the outer peripheral portion Ao than in the central portion Ac. In this case, the stirring control device 70 determines that the state of the slurry SL has not reached the target state and the stirring of the slurry SL is insufficient, and continues the stirring of the slurry SL. On the other hand, when there is not a significant difference in the distribution of the distance D between the centers of gravity between the outer peripheral portion Ao and the central portion Ac, the stirring control device 70 determines that the state of the slurry SL has reached the target state and the stirring of the slurry SL is sufficient, and the stirring control device 70 ends the stirring of the slurry SL.

Figure 8:
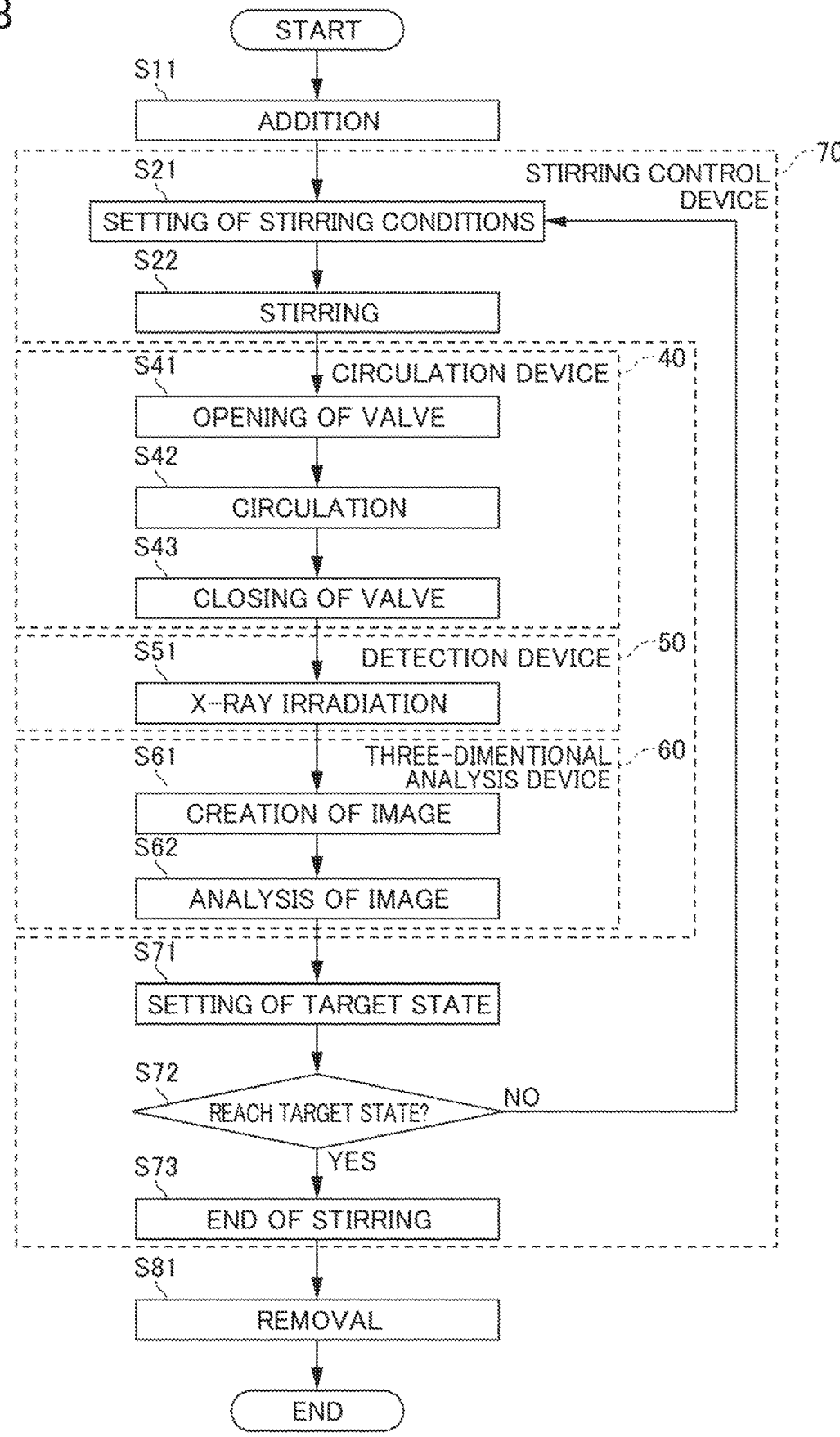
FIG. 8 is a flowchart showing a method for manufacturing the slurry for a battery.

FIG. 8 is a flowchart showing a manufacturing method of the slurry SL for a battery by using the manufacturing apparatus 100 described above. In the following description, "S" indicated before a numeral is an abbreviation for "step".

First, in S11, an operator or the like adds the slurry SL into the stirring tank 20 without exposure to the atmosphere, and presses a stirring start button of the manufacturing apparatus 100 to start stirring the slurry SL.

Next, S21 and S22 as stirring steps performed after S11 will be described. First, in S21, the stirring control device 70 sets stirring conditions. Specifically, for example, in the first S21 in the flow, predetermined stirring conditions are set, and in the second and subsequent S21, the stirring conditions are sequentially updated. Next, in S22, the stirring control device 70 controls the stirring device 10 based on the set stirring conditions to perform stirring.

Next, S41, S41 and S43 as circulation steps performed after S22 will be described. First, in S41, the circulation device 40 opens the valves 42 and 46. Next, in S42, the circulation device 40 operates the pump 44 to introduce the slurry SL in the stirring tank 20 into the observation container 30. Next, in S43, the circulation device 40 closes the valves 42 and 46.

Next, S51 as a detection step performed after S43 will be described. In S51, the rotation device 57 and the main body 53 perform the above-described cooperating operation to detect the state of the slurry SL in the observation container 30 from a plurality of angles.

Next, S61 and S62 as analysis steps performed after S51 will be described. First, in S61, the image creation portion 61 creates a three-dimensional image based on the detected state of the slurry SL from the plurality of angles. Next, based on the created three-dimensional image, in S62, the image analysis portion 62 analyzes the current state of the slurry SL, i.e., the distribution of the distance D between the centers of gravity.

Next, S71 to S73 as stirring control steps performed after S62 will be described. First, in S71, the stirring control device 70 sets the target state of the slurry SL based on information such as past battery test results, raw material data, and stirring state information, other than the three-dimensional image.

Next, in S72, the stirring control device 70 determines whether the current state of the slurry SL, i.e., the distribution of the distance D between the centers of gravity, has reached the target state. When a negative determination is made, the process returns to S11, and the stirring conditions are reset. Specifically, for example, the stirring conditions are reset so that the stirring torque decreases as the difference between the current state and the target state of the slurry SL decreases. On the other hand, when an affirmative determination is made in S72, the process proceeds to S73 to end the stirring.

In S81 performed after S73, the operator or the like removes the completed slurry SL for a battery from the stirring tank 20 without exposure to the atmosphere. Thus, the flow ends.

The effects of the present embodiment are summarized below. The circulation device 40 circulates the slurry SL between the stirring tank 20 and the observation container 30 without exposure to the atmosphere. The detection device 50 detects the state of the slurry SL by irradiating the slurry SL in the observation container 30 with X-rays and detecting X-rays transmitted through the slurry SL. Therefore, the state of the slurry SL during stirring can be detected without exposure to the atmosphere. In addition, since the state of the slurry SL is detected with X-rays, the state of the slurry SL can be detected with high accuracy as compared with the case of estimating the state of the slurry SL based on the torque, viscosity, temperature, visual observation, and the like during the stirring of the slurry. In this way, the state of the slurry SL during stirring can be detected without exposure to the atmosphere and with high accuracy.

In addition, the inside of the observation container 30 is formed in a tapered shape that reduces in diameter in the circulation direction. Therefore, when the state of the slurry SL is analyzed, an inner diameter portion of the observation container 30 with good X-ray resolution can be selected. Thus, the state of the slurry SL can be detected with high resolution.

Further, the detection device 50 detects the state of the slurry SL from a plurality of angles, and the three-dimensional analysis device 60 performs three-dimensional analysis of the state of the slurry SL based on the state of the slurry SL from the plurality of angles. The three-dimensional analysis enables the state of the slurry SL to be understood with higher accuracy.

In addition, the stirring control device 70 determines the timing of ending the stirring of the slurry SL based on the result of the three-dimensional analysis. This makes it easier to end stirring at an appropriate timing without excess or deficiency.

EXPLANATION OF REFERENCE NUMERALS 10 stirring device
20 stirring tank
30 observation container
40 circulation device
50 detection device
53 main body
57 circulation device
60 three-dimensional analysis device
70 stirring control device
100 apparatus for manufacturing a slurry for a battery
SL slurry

What is claimed is:

1. An apparatus for manufacturing a slurry for a battery, the apparatus comprising:
  a stirring tank configured to store a slurry for a battery without exposure to an atmosphere;
  a stirrer configured to stir the slurry in the stirring tank;
  an observation container coupled to the stirring tank;
  a circulator configured to circulate the slurry between the stirring tank and the observation container without exposure to an atmosphere; and
  a detector configured to detect a state of the slurry by irradiating the slurry in the observation container with X-rays and detecting the X-rays transmitted through the slurry,
  wherein an inside of the observation container is formed in a tapered shape that reduces in diameter in a circulation direction of the slurry.

2. The apparatus according to claim 1,
  wherein the detector comprises a main body configured to emit and detect X-rays, and a rotator configured to rotate one of the main body or the observation container relative to the other, wherein the detector is configured to Irradiate the slurry in the observation container with X-rays from a plurality of angles different from each other, and to detect a state of the slurry from the plurality of angles, by way of cooperation between the rotator and the main body, and
  wherein the apparatus further comprises a three-dimensional analyzer configured to perform three-dimensional analysis of the slurry based on the state of the slurry detected from the plurality of angles.

3. An apparatus for manufacturing a slurry for a battery, the apparatus comprising:
  a stirring tank configured to store a slurry for a battery without exposure to an atmosphere;
  a stirrer configured to stir the slurry in the stirring tank;
  an observation container coupled to the stirring tank;
  a circulator configured to circulate the slurry between the stirring tank and the observation container without exposure to an atmosphere; and
  a detector configured to detect a state of the slurry by irradiating the slurry in the observation container with X-rays and detecting the X-rays transmitted through the slurry,
  wherein the detector comprises a main body configured to emit and detect X-rays, and a rotator configured to rotate one of the main body or the observation container relative to the other,
  wherein the detector is configured to irradiate the slurry in the observation container with X-rays from a plurality of angles different from each other, and to detect a state of the slurry from the plurality of angles, by way of cooperation between the rotator and the main body, and
  wherein the apparatus further comprises a three-dimensional analyzer configured to perform three-dimensional analysis of the slurry based on the state of the slurry detected from the plurality of angles.

4. The apparatus according to claim 3, further comprising a stirring controller configured to determine a timing of ending the stirring of the slurry based on a result of the three-dimensional analysis.

* * * * *